(12) United States Patent
Freely et al.

(10) Patent No.: US 11,814,154 B2
(45) Date of Patent: Nov. 14, 2023

(54) PITCH ANGLES OF AN AIRCRAFT ENGINE ROTOR ASSEMBLY

(71) Applicant: General Electric Company, Schenectady, NY (US)

(72) Inventors: Brendan Michael Freely, Loveland, OH (US); Kurt David Murrow, Springboro, OH (US); Michael James McMahon, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/383,031

(22) Filed: Jul. 22, 2021

(65) Prior Publication Data

US 2022/0063792 A1 Mar. 3, 2022

Related U.S. Application Data

(60) Provisional application No. 63/072,589, filed on Aug. 31, 2020.

(51) Int. Cl.
*F02C 6/20* (2006.01)
*B64C 11/30* (2006.01)
*F01D 5/12* (2006.01)
*F02C 9/00* (2006.01)

(52) U.S. Cl.
CPC .............. *B64C 11/305* (2013.01); *F01D 5/12* (2013.01); *F02C 6/20* (2013.01); *F02C 9/00* (2013.01); *F05D 2220/323* (2013.01)

(58) Field of Classification Search
CPC .... F02C 7/04; F02C 7/042; F02C 7/00; F02C 9/16; F02C 9/20; F05D 2270/17; F02K 3/06
See application file for complete search history.

(56) References Cited

U.S. PATENT DOCUMENTS

| | | | |
|---|---|---|---|
| 5,054,998 A * | 10/1991 | Davenport | B64D 33/04 416/129 |
| 5,135,185 A | 8/1992 | Adamson et al. | |
| 7,328,870 B2 | 2/2008 | Lazare | |
| 7,877,980 B2 | 2/2011 | Johnson | |
| 8,402,740 B2 | 3/2013 | Guemmer | |
| 8,645,007 B2 * | 2/2014 | Golling | B64C 21/025 701/8 |
| 8,800,912 B2 | 8/2014 | Oliver | |
| 9,096,312 B2 | 8/2015 | Moxon | |
| 9,879,561 B2 * | 1/2018 | Lecordix | F02C 9/20 |
| 10,272,998 B2 | 4/2019 | Zachary | |

(Continued)

FOREIGN PATENT DOCUMENTS

| | | |
|---|---|---|
| DE | 102004024850 A1 | 11/2005 |
| WO | WO2013039853 A1 | 3/2013 |
| WO | WO2015166430 A1 | 11/2015 |

*Primary Examiner* — Thuyhang N Nguyen
(74) *Attorney, Agent, or Firm* — Dority & Manning, P.A.

(57) ABSTRACT

A method of operating an aircraft engine coupled to a wing of an aircraft including: setting a pitch of a plurality of rotor blades of a rotor assembly of the aircraft engine at non-uniform pitch angles along a circumferential direction of the aircraft engine such that the plurality of rotor blades define a first pitch at a first position and a second pitch at a second position, wherein the second position is 180 degrees offset from the first position, and wherein the first pitch is different from the second pitch.

17 Claims, 6 Drawing Sheets

(56) References Cited

U.S. PATENT DOCUMENTS

| | | |
|---|---|---|
| 10,570,926 B2 | 2/2020 | Maciolek |
| 10,641,290 B1 | 5/2020 | Piasecki et al. |
| 11,149,639 B2 * | 10/2021 | Duge ...................... F02C 7/042 |
| 2014/0223884 A1 * | 8/2014 | Sankrithi .................. F01D 7/00 |
| | | 60/204 |
| 2016/0059958 A1 | 3/2016 | Kvinevskiy |
| 2018/0363481 A1 * | 12/2018 | Bailey ................... F04D 29/362 |
| 2019/0118935 A1 | 4/2019 | Love et al. |
| 2019/0163502 A1 | 5/2019 | Malone, II et al. |
| 2019/0193835 A1 | 6/2019 | Sandberg et al. |
| 2020/0024982 A1 * | 1/2020 | Zysman .................. B64C 11/06 |
| 2020/0088108 A1 * | 3/2020 | Klein ....................... F02K 3/06 |

* cited by examiner

PITCH ANGLES OF AN AIRCRAFT ENGINE ROTOR ASSEMBLY

CROSS-REFERENCE TO RELATED APPLICATIONS

This application is a non-provisional application claiming the benefit of priority under 35 U.S.C. § 119(e) to U.S. Provisional Application No. 63/072,589, filed Aug. 31, 2020, which is hereby incorporated by reference in its entirety.

FIELD

The present subject matter relates generally to aircraft having distributed propulsion systems.

BACKGROUND

Aircrafts can include various high-lift devices for controlling the lift thereof during flight. For instance, an aircraft can include slats, flaps, and/or other movable and/or fixed devices for increasing the lift of the aircraft. Such devices can be particularly useful during the takeoff and landing phases of flight. While such high-lift devices are effective at increasing the lift of an aircraft, such devices can add complexity and mass to the aircraft, which is undesirable. As one example, movable high-lift devices can be controlled hydraulically. Hydraulic systems positioned in part along the wings of an aircraft can be complex and add mass to the wings.

Accordingly, aircraft and methods of operating an aircraft that address one or more of the challenges noted above would be useful.

BRIEF DESCRIPTION

Aspects of the present disclosure are directed to distributed control systems and methods of controlling turbomachines. Aspects and advantages of the invention will be set forth in part in the following description, or may be obvious from the description, or may be learned through practice of the invention.

In one aspect, a method of operating an aircraft engine coupled to a wing of an aircraft is provided. The method includes: setting a pitch of a plurality of rotor blades of a rotor assembly of the aircraft engine at non-uniform pitch angles along a circumferential direction of the aircraft engine such that the plurality of rotor blades define a first pitch at a first position and a second pitch at a second position, wherein the second position is 180 degrees offset from the first position, and wherein the first pitch is different from the second pitch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
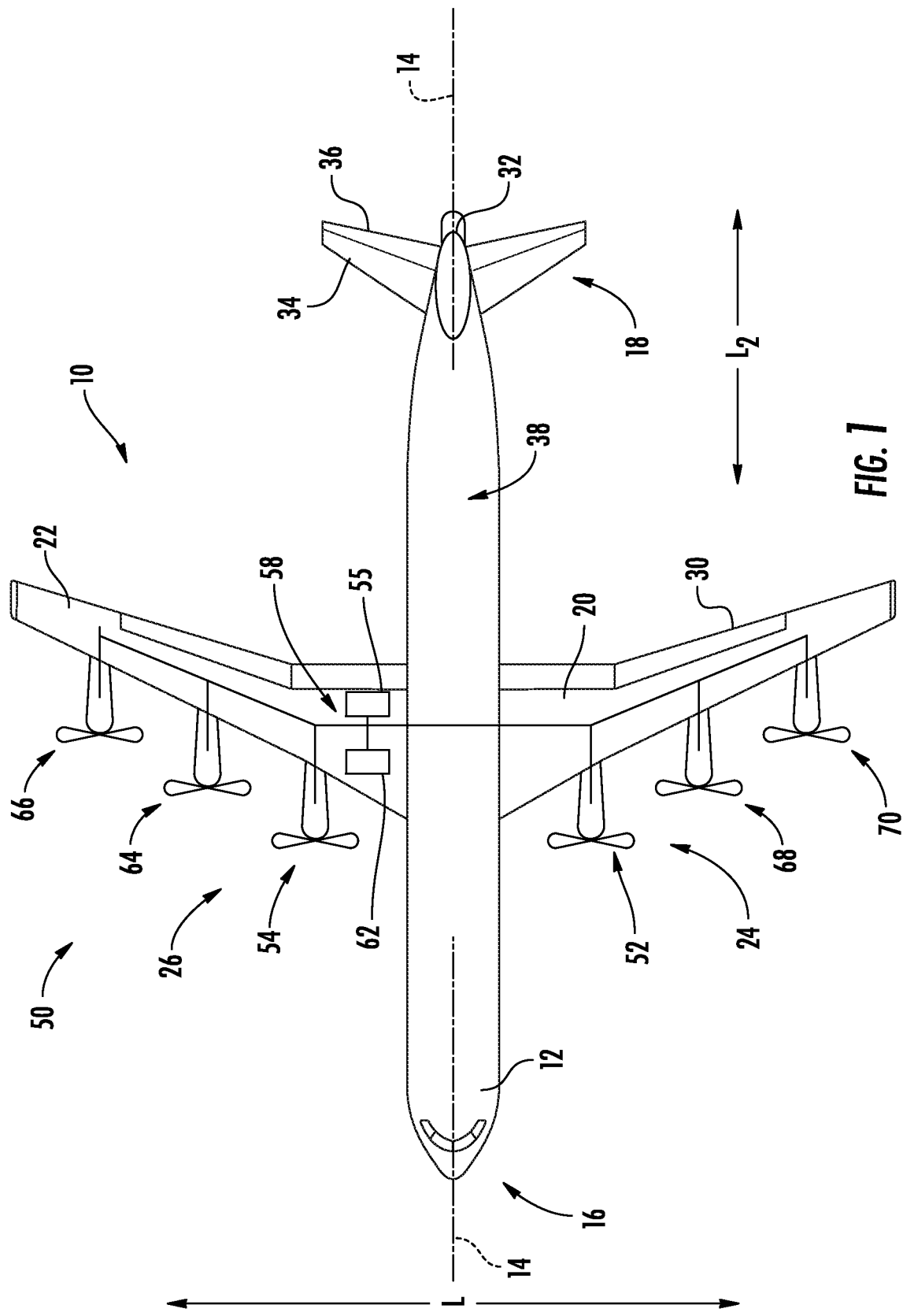
FIG. 1 is a top view of an aircraft in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not be limited to, an operator interface monitor, or the output channels may be linked to various components to control such components based, e.g., on data reviewed from the input channels and/or data or instructions stored in the memory. For example, the memory may store software or other instructions, which when executed by the controller or processor allow the controller to perform certain operations or functions. The term "software" may include any computer program stored in memory, or accessible by the memory, for execution by, e.g., the controller, processor, clients, and servers.

Aspects of the present disclosure are directed to an aircraft having a fan propulsion system and methods of operating the same. In one aspect, an aircraft includes a wing having a top surface and a bottom surface. The aircraft also has an aircraft engine having a rotor assembly with a plurality of rotor blades. During operation, the plurality of rotor blades move between a first position and a second position. The second position is 180 degrees offset from the first position (180 degrees offset in a plane defined by the rotation of the rotor blades, about a rotational axis of the rotor blades). A pitch change mechanism of the aircraft engine is configured to set a pitch of a plurality of rotor blades of a rotor assembly of the aircraft engine at non-uniform pitch angles along a circumferential direction of the aircraft engine such that the plurality of rotor blades define a first pitch at the first position and a second pitch at the second position. The first pitch is different from the second pitch.

For example, in certain exemplary aspects, at least a portion of the fan blades may be above the wing when in the first position and at least a portion of the fan blades may be below the wing when in the second position. In such a manner, the engine may be configured to increase an airflow over a top of the wing, to increase an amount of lift generated by the wing. Such may be achieved during a high lift operation, such as takeoff or landing, potentially allowing for the wing of the aircraft to omit some or all of the flaps and other structure presently used to increase a lift of the wing.

During other operations, the pitch change mechanism of the aircraft engine may be configured to set a pitch of the plurality of rotor blades of the rotor assembly of the aircraft engine at uniform pitch angles along the circumferential direction of the aircraft engine.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted may include one or more flaps. In particular, for the embodiment shown, each wing 20, 22 includes a plurality of trailing edge flaps 30. It will be appreciated, however, in certain aspects of the present disclosure, the wings 20, 22 may not include flaps, and instead may utilize other features for increasing a lift of the wings 20, 22.

The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer(s), may be configured as a blended wing aircraft, etc.

Figure 2:
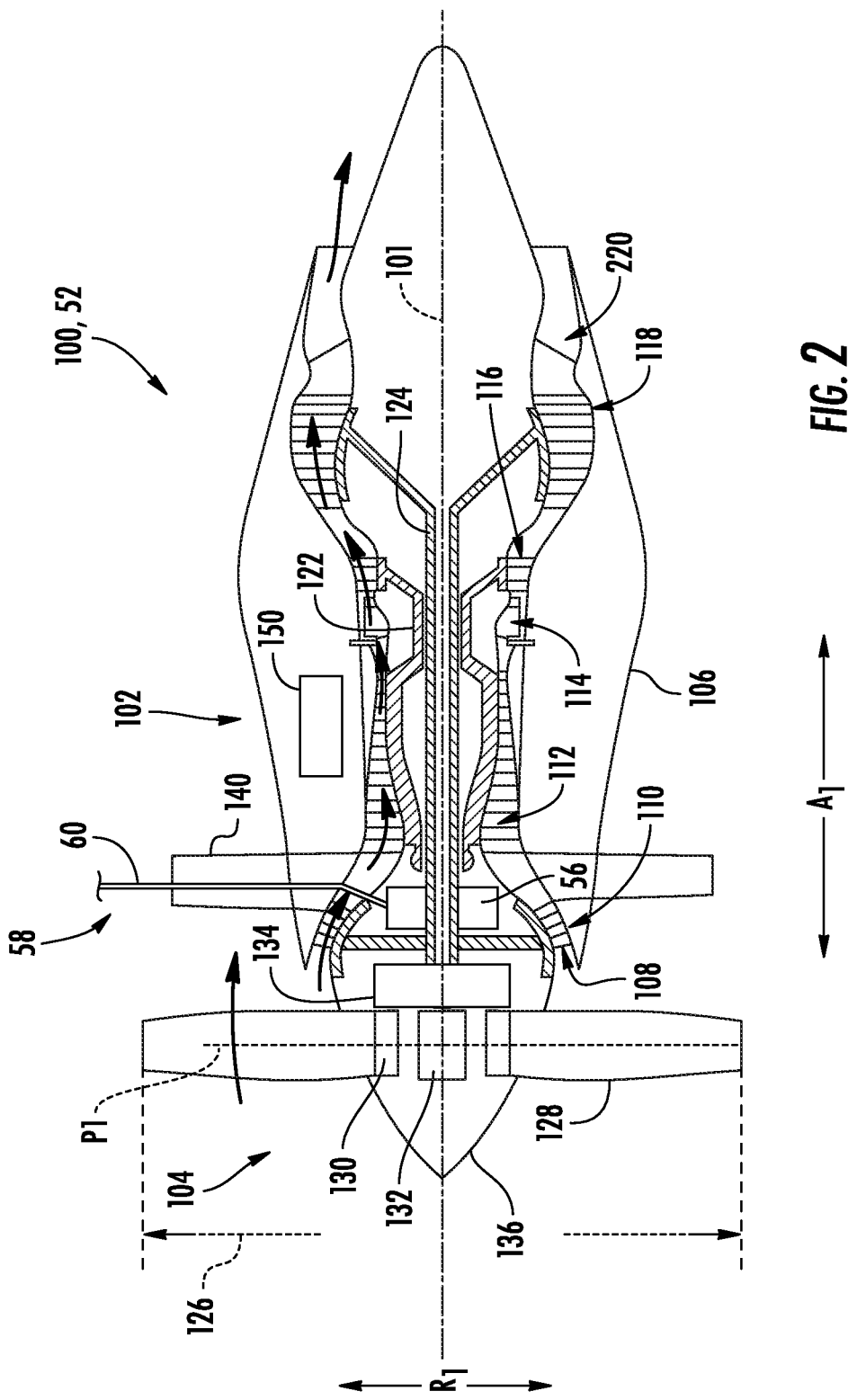
FIG. 2 is a side, schematic view of a gas turbine engine as may be utilized in an exemplary aspect of the present disclosure.
Figure 3:
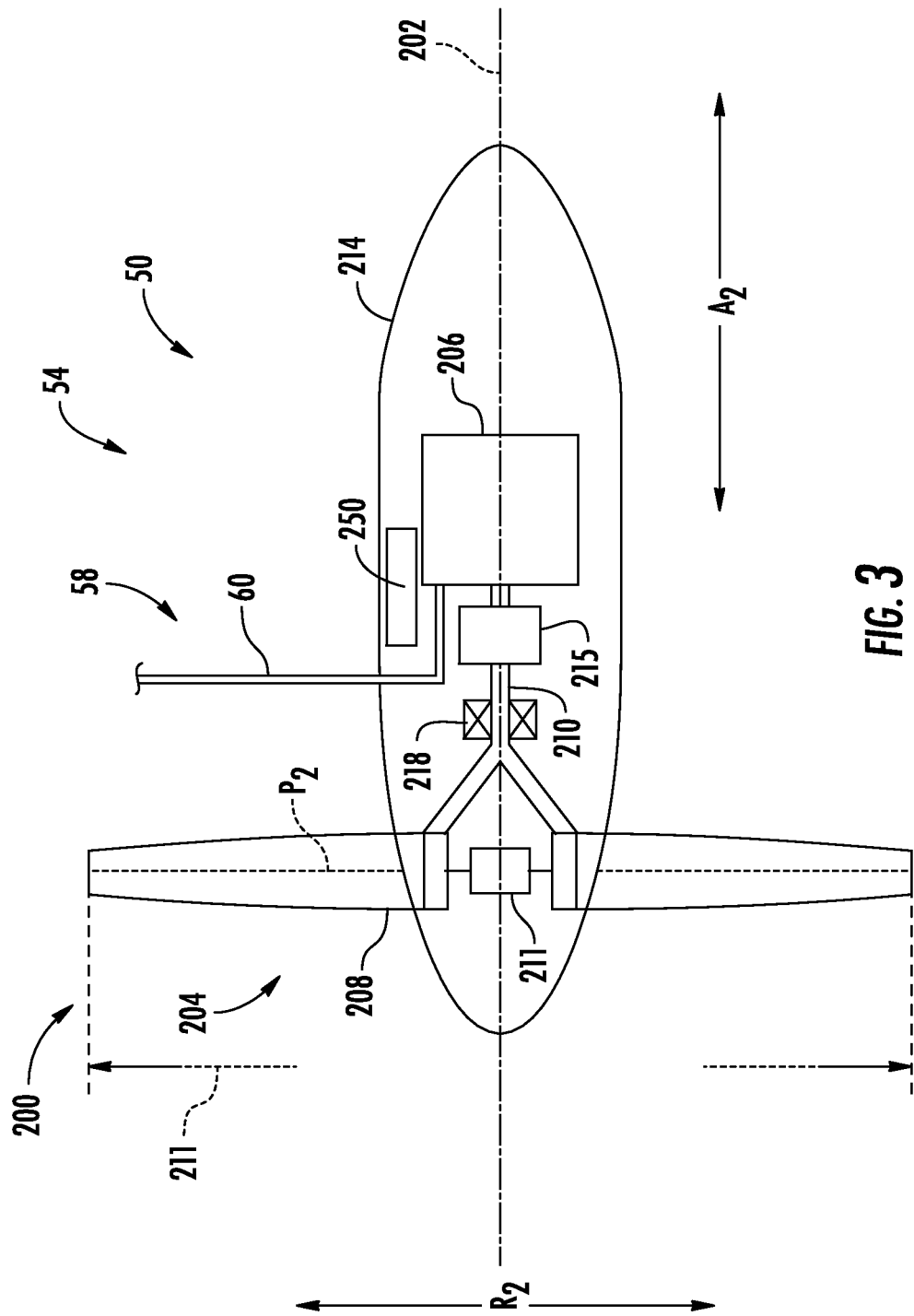
FIG. 3 is a side, schematic view of an electric propulsion engine as may be utilized in an exemplary aspect of the present disclosure.

Referring now also to FIGS. 2 and 3, the exemplary aircraft 10 of FIG. 1 additionally includes a propulsion system 50 having a plurality of propulsors, and in particular includes a plurality of propulsors distributed along a length of the first wing 20 and along a length of the second wing 22. For the embodiment shown, the propulsion system 50 includes six propulsors (three on each wing), but in other embodiments, the propulsion system may include any other suitable number or arrangement of propulsors (e.g., 1, 2, 3, 4, 5, 7, 8, 9, 10, or more and up to, e.g., 20).

For the embodiment shown, the propulsion system is a hybrid-electric propulsion system, including a first propulsor 52 and a second propulsor 54. FIG. 2 provides a schematic, cross-sectional view of the first propulsor 52 (labeled as the turbofan engine 100), and FIG. 3 provides a schematic, cross-sectional view of the second propulsor 54.

Referring particularly to FIGS. 1 and 2, the first propulsor 52 is mounted, or configured to be mounted, to the first side 24 of the aircraft 10, or more particularly, to the first wing 20 of the aircraft 10. The first propulsor 52 generally includes a turbomachine 102 and a primary fan (referred to simply as "fan 104" with reference to FIG. 2). More specifically, for the embodiment depicted the first propulsor 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, low pressure (LP) turbine 118 and a second, high pressure (HP) turbine 116; and a jet exhaust nozzle section 120. It will be appreciated, that the terms "high" and "low" are used herein to simply differentiate the components of one spool with the components of the other spool, and does not imply any absolute (or relative) pressure or speed values.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. As will be appreciated, the fan 104 defines a fan diameter 126. The fan diameter 126 refers to a measurement twice as long as a radius of a fan blade 128, the radius of a fan blade 128 being a measurement from a tip of a fan blade 128 to the longitudinal centerline axis 101 along the radial direction R1.

The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to vary the pitch of the fan blades 128, as will be explained in greater detail, below. More specifically, the actuation member/pitch change mechanism 132 may be configured to change a pitch of the fan blades 128 in a non-uniform manner such that the fan blades 128 define a first pitch a top of the rotation and a second, different pitch at a bottom of the rotation. Accordingly, the actuation member/pitch change mechanism 132 may include, e.g., a stationary swash plate and rotating swash plate, where the stationary swash plate is controlled to control the pitch of the fan blades 128 and the rotating swash plate is mechanically in communication with the stationary swash plate and conveys the pitch position to the fan blades 128 through various pitch links. It will be appreciated, however, that in other exemplary embodiments, any other suitable actuation member/pitch change mechanism 132 may be used.

The fan 104 is mechanically coupled to the LP shaft 124, such that the fan 104 is mechanically driven by the first, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, a front hub 136 is provided forward of the disk 130 and rotatable with the disk 130. The front hub 136 is aerodynamically contoured to promote an airflow through the plurality of fan blades 128.

Referring still to FIG. 2, the propulsion system 50 additionally includes an electric machine 56, which may act as both an electric generator and an electric motor. The electric machine 56 is, for the embodiment depicted, positioned within the turbomachine 102 of the turbofan engine 100 and is in mechanical communication with one of the shafts of the turbofan engine 100. More specifically, for the embodiment depicted, the electric machine 56 is driven by the first, LP turbine 118 through the LP shaft 124. The electric machine 56 is configured to convert mechanical power of the LP shaft 124 to electric power. Accordingly, the electric machine 56 is also powered by the LP system (including the LP turbine 118) of the turbomachine 102.

It should be appreciated, however, that in other exemplary embodiments, the electric machine 56 may instead be positioned at any other suitable location within the turbomachine 102 or elsewhere, and may be, e.g., powered in any other suitable manner. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through the HP shaft 122, or by both the LP system (e.g., the LP shaft 124) and the HP system (e.g., the HP shaft 122) via a dual drive system.

It should further be appreciated that the exemplary turbofan engine 100 depicted in FIG. 2 may, in other exemplary embodiments, have any other suitable configuration. For example, in other exemplary embodiments, the LP shaft 124 may be directly mechanically coupled to the fan 104 (i.e., the turbofan engine 100 may not include the gearbox 134). Further, it should be appreciated, that in other exemplary embodiments, the turbofan engine 100 may instead be configured as any other suitable aircraft engine including a turbomachine mechanically coupled to a primary fan. For example, in other embodiments, the turbofan engine 100 may instead be configured as a turboprop engine (i.e., the primary fan may be configured as a propeller), a ducted turbofan engine, etc.

Referring still to FIGS. 1 and 2, the propulsion system 50 depicted additionally includes an electrical power bus 58 to allow the electric machine 56 to be in electrical communication with one or more other components of the propulsion system 50 and/or the aircraft 10. For the embodiment depicted, the electrical power bus 58 includes one or more electrical lines 60 connected to the electric machine 56, and for the embodiment depicted, extending through one or more of the outlet guide vanes 140. Additionally, the propulsion system 50 depicted further includes one or more energy storage devices 55 (such as one or more batteries or other electrical energy storage devices) electrically connected to the electrical power bus 58 for, e.g., providing electrical power to the electric fan assembly 54 and/or receiving electrical power from the electric machine 56. In certain exemplary embodiments, the one or more energy storage devices 55 may be positioned proximate the electric fan assembly 54 for weight distribution purposes. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor 54 positioned, or configured to be positioned, at a location spaced apart from the first propulsor 52 (including, e.g., the turbomachine and the primary fan). More specifically, for the embodiment depicted, the second propulsor 54 is mounted at a location away from the first propulsor 52 along the lateral direction L such that they ingest different airstreams along the lateral direction L. However, in other embodiments, the first and second propulsor assemblies 52, 54 may each be mounted to the aircraft 10 using a common mount (e.g., setting the physical position relative to the aircraft centerline and the like). With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor 54 is mounted to the second side 26 of the aircraft 10, or rather to the second wing 22 of the aircraft 10. Referring particularly to FIG. 3, the second propulsor 54 is generally configured as an electric fan assembly including an electric fan 200. The electric fan 200 defines an axial direction A2 extending along a longitudinal centerline axis 202 that extends therethrough for reference, as well as a radial direction R2. Additionally, the electric fan 200 generally includes a fan 204 and an electric machine, which for the embodiment depicted is configured as an electric motor 206. For the embodiment depicted, the fan 204 is rotatable about the centerline axis 202.

The fan 204 includes a plurality of fan blades 208 and a fan shaft 210. The plurality of fan blades 208 are attached to/rotatable with the fan shaft 210 and spaced generally along a circumferential direction of the electric fan 200 (not shown). More specifically, the fan 204 of the electric fan 200 generally includes a total number of fan blades 208 and defines a fan diameter 211. The fan diameter 211 refers to a measurement twice as long as a radius of a fan blade 208, the radius of a fan blade 208 being a measurement from a tip of a fan blade 208 to the longitudinal centerline axis 22 along the radial direction R2.

In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed by a pitch change mechanism 211, as will be described in more detail, below. With such an exemplary embodiment, the fan 204 may be referred to as a variable pitch fan.

Referring still particularly to FIG. 3, the fan shaft 210 is mechanically coupled to the electric motor 206 within the core 214, such that the electric motor 206 drives the fan 204 through the fan shaft 210. For the embodiment depicted, the electric motor 206 is configured as a variable speed electric motor, such that the electric motor 206 may drive the fan 204 at various rotational speeds. Additionally, for the embodiment depicted, the electric fan 200 additionally includes a gearbox 215 allowing for the rotational speed of the fan shaft 210 to be further increased or decreased relative to a rotational speed of the electric motor 206. Accordingly, for the embodiment depicted, the electric motor 206 further drives the fan 204 across the gearbox 215 and through the fan shaft 210.

The fan shaft 210 is supported by one or more bearings 218, such as the one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor). As noted above, the electric machine 56 of the propulsion system 50 is in electrical communication with the electric fan 200 for powering the electric fan 200. More particularly, for the exemplary embodiment depicted in FIG. 3, the electric motor 206 of the electric fan 200 is in electrical communication with the electrical power bus 58, which for the embodiment depicted includes one or more electrical lines 60 electrically connected to the electric motor 206. Accordingly, the electric motor 206 is more particularly in electrical communication with the electrical power bus 58 through one or more electrical lines 60 of the electrical power bus 58, and the electrical power bus 58 may deliver power to the electric motor 206 for driving the electric motor 206, and in turn driving the fan 204.

Referring again briefly to FIG. 1, the propulsion system 50 depicted, or rather, the electric power bus 58 depicted, additionally includes an electric controller 62. The exemplary electric machine 56 depicted is in electrical communication with the electric fan 200 through the electric controller 62 of the electric power bus 58. The electric controller 62 may be operably connected to one or more additional controllers of the aircraft, for controlling an amount of power provided to the electric fan assembly. Moreover, as is depicted in FIGS. 2 and 3, each of the engines 100, 200 include controllers 150, 250. The controller 150 may be a Full Authority Digital Engine Control (FADEC) controller, and the controller 250 may be the equivalent for an electric propulsor. The controllers 150, 250 may generally be configured to receive data indicative of various operating conditions of the engines 100, 200, the aircraft 10, or both and control operations of the engines 100, 200, respectively, based on this information received. For example, the controllers 150, 250 may be configured to receive information regarding an operating condition of the engines 100, 200, the aircraft 10, or both that may be indicative of a high lift operating condition, and in response may control the respective pitch change mechanisms 132, 211 to vary a pitch of the respective rotor blades 128, 208 of the respective rotor assemblies 104, 204, in response. Such a concept will be described in more detail below.

The propulsion system further includes a third, fourth, fifth, and sixth propulsor 64, 66, 68, 70. One or more of these propulsors 64, 66, 68, 70 may be configured in a similar manner as the first propulsor 52, and/or one or more of these propulsors 64, 66, 68, 70 may be configured in a similar manner as propulsor 54.

Figure 4:
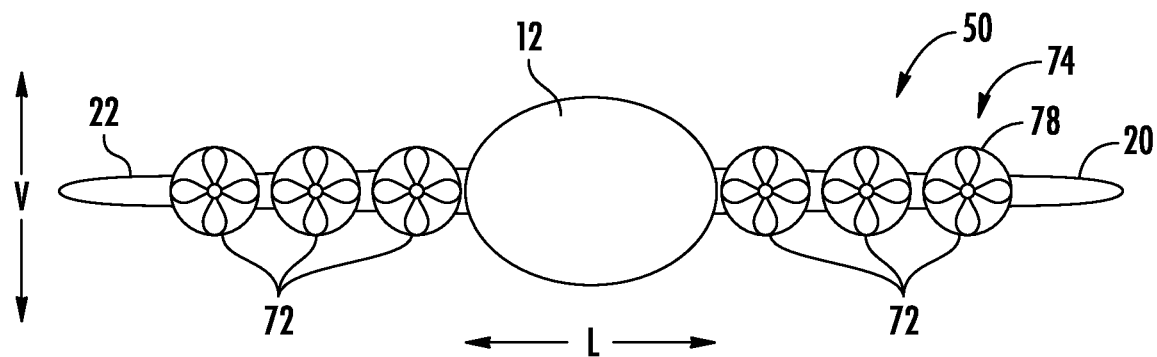
FIG. 4 is a schematic forward-looking-aft view of an aircraft in accordance with an exemplary aspect of the present disclosure.

It should be appreciated, however, that in other embodiments, the propulsion system 50 may additionally or alternatively be configured in any other suitable manner, and the embodiment described above with reference to FIGS. 1-3 is provided by way of example only Referring now to FIG. 4, a schematic, forward-looking-aft view is provided of an aircraft 10 in accordance with an exemplary embodiment of the present disclosure. The exemplary aircraft 10 depicted in FIG. 4 may be configured in a similar manner as exemplary aircraft 10 described above with reference to FIGS. 1 through 3. Accordingly, it will be appreciated that the exemplary aircraft 10 generally defines a vertical direction V, a lateral direction L, and a longitudinal direction L2 (see FIGS. 1, 6), and includes the fuselage 12, first and second wings 20, 22 extending outwardly from the fuselage 12 along the lateral direction L, and a propulsion system 50 having a plurality of propulsors 72. The propulsors 72 depicted in FIG. 4 may be configured in a similar manner as one or more of the exemplary propulsors 52, 54, 64, 66, 68, 70 described above with reference to FIGS. 1 through 3. Accordingly, it will be appreciated that each of the propulsors 72 generally includes a fan 74 (or rotor assembly) and a drive system 76 (see, e.g., FIG. 6, below). The drive system 76 may be, e.g., a turbomachine, similar to the exemplary turbomachine 95 described above with reference to FIG. 2, an electric motor similar to the exemplary electric motor 206 described above with reference FIG. 3, or any other suitable drive system 76.

Figure 5:
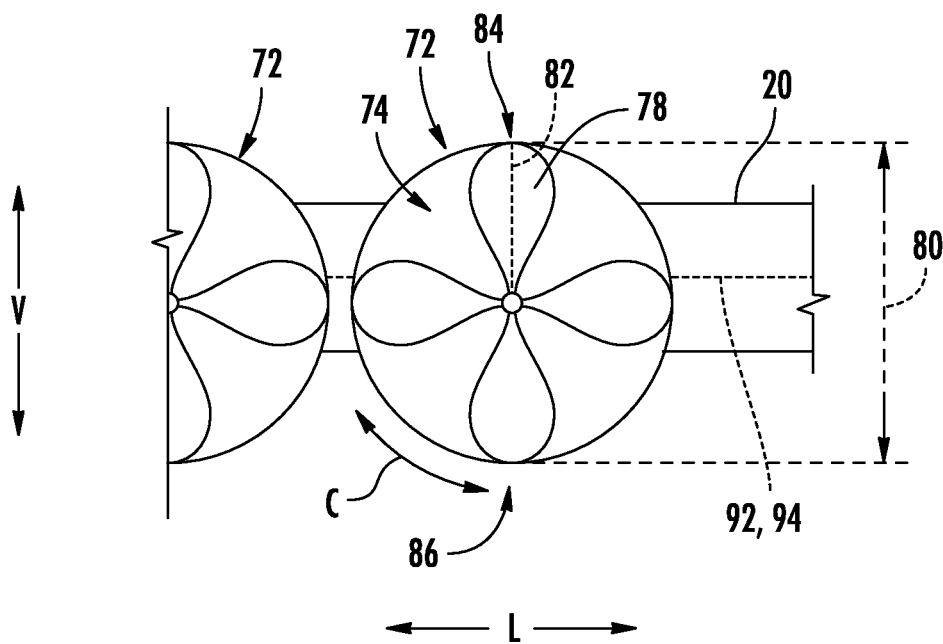
FIG. 5 is a close-up, schematic view of a propulsor of the exemplary aircraft of FIG. 4.

Further, referring now also to FIG. 5, providing a close-up view of one of the exemplary propulsors 72 in FIG. 4, it will further be appreciated that the fan 74 generally includes a plurality of fan blades 78 defining a fan diameter 80. Further, it will be appreciated that the fan 74 is a variable pitch fan, such that each of the plurality of fan blades 78 is rotatable by a pitch change mechanism (not depicted; similar to, e.g., exemplary pitch change mechanism 132 and/or 211 described above with reference to FIGS. 2 and 3) about respective pitch axes 82.

Figure 6:
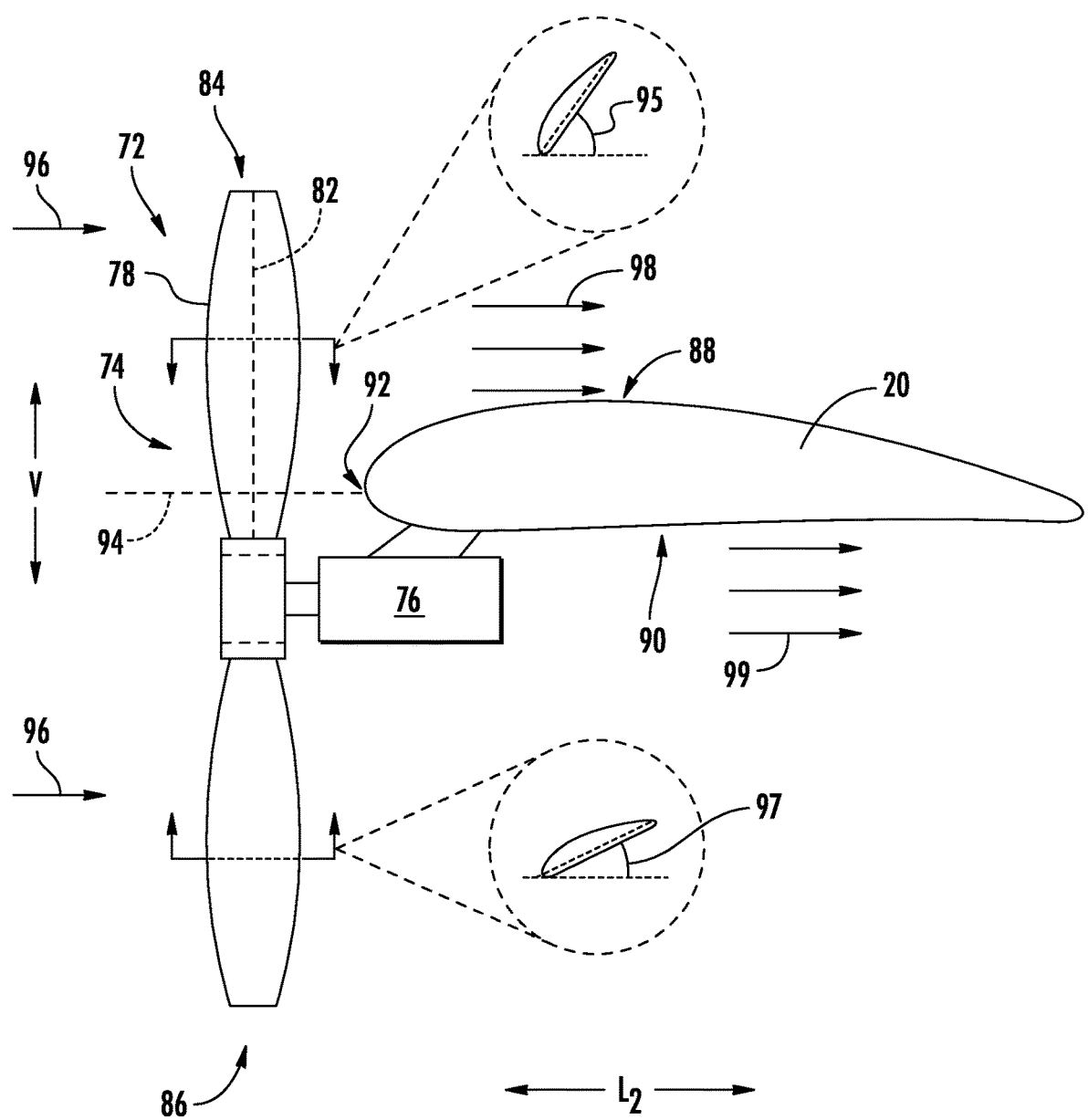
FIG. 6 is a side, schematic view of a propulsor of the exemplary aircraft of FIG. 4.

Referring now also to FIG. 6, providing a side, schematic view of the exemplary propulsor 72 of FIG. 5, it will be appreciated that the fan 74 defines a first position 84 and a second position 86. The second position 86 is 180° offset from the first position 84 in a circumferential direction C of the propulsor 72. More specifically, it will be appreciated that the first position 84 is a top position along the vertical direction V and the second position 86 is a bottom position along the vertical direction V.

Referring still to FIGS. 5 and 6, it will be appreciated that the wing 20 of the aircraft 10 defines a top 88 and a bottom 90 along the vertical direction V. The top 88 of the wing 20 is a suction side of the wing 20 and the bottom 90 of the wing 20 is a pressure side of the wing 20. For reasons that will be explained in more detail below, the propulsor 72 is mounted to the wing 20 of the aircraft 10 such that the plurality of fan blades 78 extend at least partially over the top 88 of the wing 20 (along the vertical direction V) when in the first position 84 and further extend at least partially below a bottom 90 of the wing 20 (along the vertical direction V) when in the second position 86.

More specifically, for the embodiment shown, the wing 20 defines a stagnation point 92 at a forward lip (see particularly FIG. 6). Further, the plurality of fan blades 78 together define a fan blade area, measured according to the equation $\pi \times r^2$, where "r" is one half of the fan diameter 80. Further, the aircraft 10, or here the wing 20 of the aircraft 10, defines a reference plane 94 extending through the fan blade area and stagnation point 92, parallel to an airflow direction 96 approaching the propulsor 72 (see particularly FIG. 6). The plurality of fan blades 78 define a first portion of the fan blade area located above the reference plane 94 and a second portion of the fan blade area located below the reference plane 94. The first portion may be equal to at least about 10% of the fan blade area, such as a at least about 20% of the fan blade area, such as a at least about 30% of the fan blade area, such as a at least about 40% of the fan blade area, such as up to 90% of the fan blade area, such as up to 80% of the fan blade area. In such a manner, it will be appreciated that the propulsors 72 are configured to provide a first airflow 98 over the top 88 of the wing 20 and a second airflow 99 over the bottom 90 of the wing 20.

Referring particularly to FIG. 6, it will be appreciated that the aircraft 10 and the propulsion system 50 of the aircraft 10 are configured to modify a ratio of the first airflow 98 over the top 88 of the wing 20 to the second airflow 99 over the bottom 90 of the wing 20 to, in turn, modify an amount of lift generated by the wing 20. More specifically, for the exemplary embodiment depicted, it will be appreciated that the exemplary propulsor 72 is depicted in a high-lift position to increase an amount of lift generated by the wing 20. When configured in such a manner, the pitch change mechanism of the propulsor 72 is configured to set a pitch of the plurality of fan blades 78 at nonuniform pitch angles along the circumferential direction C of the propulsor 72. For example, as depicted in Circle 6A, the plurality of fan blades 78 are positioned at a first pitch defining a first pitch angle 95 at the first position 84, and as is depicted in Circle 6B, the plurality of fan blades 78 are in a second pitch defining a second pitch angle 97 at the second position 86. The first pitch is different than the second pitch.

More specifically, for the embodiment shown, the first pitch angle 95 is larger than the second pitch angle 97. For example, the first pitch angle 95 may be at least about 20% larger than the second pitch angle 97, such as a at least about 30% larger, such as a at least about 40% larger, such as at least about 50% larger, such as up to effectively an infinity percent larger (i.e., the second pitch angle 97 may be 0°).

In such a manner, when the propulsor 72 is in the high-lift position, as depicted, the first pitch is configured to provide a relatively high volume of airflow as the first airflow 98 over the wing 20, and the second pitch is configured to provide a relatively low volume of airflow as the second airflow 99 over the wing 20. By providing a higher volume of airflow over the top of the wing 20 a velocity of the first airflow 98 may increase relative to the second airflow 99, increasing a lift generated by the wing 20 (i.e., by a pressure differential between the pressure side and suction side of the wing 20).

By contrast, however, the propulsor 72 may also be moved to a low-lift position. In the low-lift position, the pitch change mechanism of the propulsor 72 may change the pitch of the plurality of fan blades 78 such that each of the plurality of fan blades 78 are at a substantially uniform pitch angle along the circumferential direction C.

In certain exemplary aspects, the propulsor 72 may be moved to the high-lift position/condition when the aircraft 10 is operating at a takeoff operating condition, a climb operating condition, a descent operating condition or landing operating condition. By contrast, the propulsor 72 may be moved to the low-lift operating condition when the aircraft 10 is operating at a cruise operating condition, a taxiing operating condition, etc.

Figure 7:
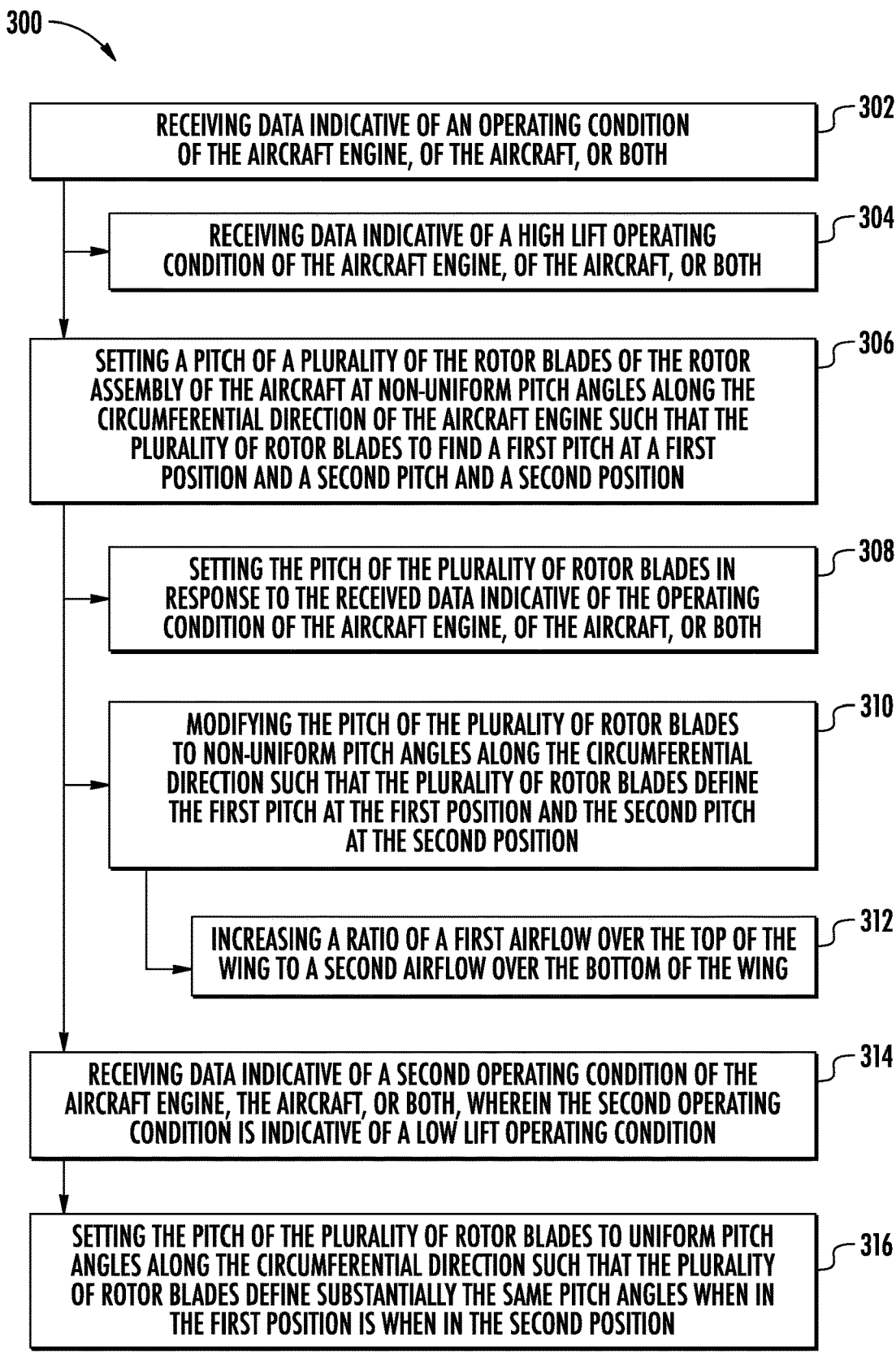
FIG. 7 is a flow diagram of a method for operating an engine in accordance with an exemplary aspect of the present disclosure.

Referring now to FIG. 7, a flow diagram of a method 300 of operating an aircraft engine coupled to a wing of an aircraft is provided. In at least certain exemplary aspects, the method 300 may be utilized with one or more of the exemplary aircraft and/or aircraft engines described above with reference to FIGS. 1 through 6. Accordingly, in at least certain exemplary aspects, the method 300 may be utilized with an aircraft engine having a rotor assembly, with the rotor assembly being an unducted rotor assembly. For example, in certain exemplary aspects, the method 300 may be utilized with an aircraft engine configured as a single inducted rotor engine having a turbomachine driving the unducted rotor assembly, or alternatively, as an electric propulsor having an unducted rotor assembly driven by an electric machine.

The exemplary aspect of the method 300 depicted includes at (302) receiving data indicative of an operating condition of the aircraft engine, of the aircraft, or both. For the exemplary aspect depicted, receiving data indicative of the operating condition at (302) includes (304) receiving data indicative of a high lift operating condition of the aircraft engine, of the aircraft, or both. In at least certain except for aspects, the high lift operating condition may be any operating condition wherein it is desirable for the wing to which the aircraft engine is mounted to generate additional lift. For example, at least certain except for aspects, the high lift operating condition may be at least one of a takeoff operating condition, a climb operating condition, descent operating condition, or landing operating condition. Additionally, alternatively, however, receiving data indicative of the high-lift operating condition at (304) may include receiving data indicative of an altitude of the aircraft, a change in altitude of the aircraft, and attitude of the aircraft, an ambient pressure, or an airspeed.

Referring still to FIG. 7, the method 300 additionally includes it (306) setting a pitch of a plurality of rotor blades of the rotor assembly of the aircraft at nonuniform pitch angles along the circumferential direction of the aircraft engine such that the plurality of rotor blades to find a first pitch at a first position and a second pitch and a second position. The second position may be 180° offset from the first position and the first pitch may be different than the second pitch.

More specifically, for the exemplary aspect depicted, setting the pitch of the plurality of rotor blades of the rotor assembly at (306) includes at (308) setting the pitch of the plurality of rotor blades in response to the received data indicative of the operating condition of the aircraft engine, of the aircraft, or both at (302). More specifically, still, for the exemplary aspect depicted, setting the pitch of the plurality of rotor blades of the rotor assembly at (306) includes at (310) modifying the pitch of the plurality of rotor blades to non-uniform pitch angles along the circumferential direction such that the plurality of rotor blades define the first pitch at the first position and the second pitch at the second position. For example, the method 300 at (310) may change the pitch angles of the plurality of rotor blades from defining a substantially uniform pitch angle along the circumferential direction to the non-uniform pitch angles as specified.

Further, for the exemplary aspect of the method 300 depicted, modifying the pitch of the plurality of rotor blades at (310) includes at (312) increasing a ratio of a first airflow over the top of the wing to a second airflow over the bottom of the wing. For example, as will be appreciated, the plurality of rotor blades may extend at least partially over a top of the wing when in the first position and may extend at least partially below a bottom of the wing when in the second position. The top of the wing may be a suction side of the wing and the bottom side of the wing may be a pressure side of the wing. In such a manner, it will be appreciated that modifying the pitch of the plurality of rotor blades at (310) may allow for the method 300 to increase an airflow over the top of the wing, thereby increasing an amount of lift generated by the wing. More specifically, for exemplary aspect depicted, it will be appreciated that the first pitch of the plurality of rotor blades when the plurality of rotor blades are at the first position is configured to provide a relatively high volume of airflow, whereas the second pitch of the plurality of rotor blades when the plurality of rotor blades are at the second position is configured to provide a relatively low volume of airflow.

In such a manner, the method 300 may function to increase a lift generated by the wing, by increasing an airflow over the top side of the wing and utilizing the airfoil shape of the wing. Such may allow for a reduction in size or elimination of one or more flaps on the wing that may otherwise be utilized to increase a lift of the wing. Reducing the size of, or eliminating, one more flaps on the wing may reduce a weight and complexity of the wing, leading to an overall more cost-effective and fuel-efficient aircraft.

Referring still to FIG. 7, it will be appreciated that the method 300 further includes (314) receiving data indicative of a second operating condition of the aircraft engine, the aircraft, or both, wherein the second operating condition is indicative of a low lift operating condition. In response, the method 300 further includes at (316) setting the pitch of the plurality of rotor blades to uniform pitch angles along the circumferential direction such that the plurality of rotor blades define substantially the same pitch angles when in the first position is when in the second position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method of operating an aircraft engine coupled to a wing of an aircraft comprising: setting a pitch of a plurality of rotor blades of a rotor assembly of the aircraft engine at non-uniform pitch angles along a circumferential direction of the aircraft engine such that the plurality of rotor blades define a first pitch at a first position and a second pitch at a second position, wherein the second position is 180 degrees offset from the first position, and wherein the first pitch is different from the second pitch.

The method of one or more of these clauses, wherein the plurality of rotor blades extend at least partially over a top of the wing when in the first position, and wherein the plurality of rotor blades extend at least partially below a bottom of the wing when in the second position.

The method of one or more of these clauses, wherein the top of the wing is a suction side of the wing, and wherein the bottom of the wing is a pressure side of the wing.

The method of one or more of these clauses, further comprising receiving data indicative of an operating condition of the aircraft engine, of the aircraft, or both, and wherein setting the pitch of the plurality of rotor blades comprises setting the pitch of the plurality of rotor blades in response to the received data indicative of the operating condition of the aircraft engine, of the aircraft, or both.

The method of one or more of these clauses, wherein the operating condition is a high lift operating condition.

The method of one or more of these clauses, wherein the operating condition is at least one of a takeoff operating condition, a climb operating condition, a descent operating condition, or a landing operating condition.

The method of one or more of these clauses, wherein setting the pitch of the plurality of rotor blades comprises modifying the pitch of the plurality of rotor blades to non-uniform pitch angles along the circumferential direction such that the plurality of rotor blades define the first pitch at the first position and the second pitch at the second position.

The method of one or more of these clauses, wherein modifying the pitch of the plurality of rotor blades comprises increasing a ratio of a first airflow over the top of the wing to a second airflow over the bottom of the wing.

The method of one or more of these clauses, wherein receiving data indicative of the operating condition of the aircraft engine comprises receiving data indicative of an altitude, a change in altitude, an attitude of the aircraft, an ambient pressure, or an airspeed.

The method of one or more of these clauses, wherein the rotor assembly of the aircraft engine is an unducted rotor assembly.

The method of one or more of these clauses, wherein the aircraft engine is configured as a single unducted rotor engine comprising a turbomachine driving the unducted rotor assembly.

The method of one or more of these clauses, wherein setting the pitch of the plurality of rotor blades comprises setting the pitch of the plurality of rotor blades with a pitch change mechanism.

The method of one or more of these clauses, further comprising: receiving data indicative of a second operating condition of the aircraft engine, the aircraft, or both, wherein the operating condition is indicative of a low lift operating condition; and setting the pitch of the plurality of rotor blades to uniform pitch angles along the circumferential direction in response to receiving data indicative of the second operating condition such that the plurality of rotor blades define substantially the same pitch angles when in the first position is when in the second position.

An aircraft engine defining a circumferential direction, the aircraft engine comprising: a turbomachine; a rotor assembly comprising a plurality of rotor blades driven by the rotor assembly; a pitch change mechanism operable with the plurality of rotor blades for changing a pitch of the plurality of rotor blades; and a controller operably connected to the pitch change mechanism and configured to set a pitch of the plurality of rotor blades through the pitch change mechanism at non-uniform pitch angles along the circumferential direction such that the plurality of rotor blades define a first pitch at a first position and a second pitch at a second position, wherein the second position is 180 degrees offset from the first position, and wherein the first pitch is different from the second pitch.

The aircraft engine of one or more of these clauses, wherein the controller is further configured to receive data indicative of an operating condition of the aircraft engine, an aircraft incorporating the aircraft engine, or both, and wherein in setting the pitch of the plurality of rotor blades the controller is further configured to modify the pitch of the plurality of rotor blades to non-uniform pitch angles along the circumferential direction such that the plurality of rotor blades define the first pitch at the first position and the second pitch at the second position.

The aircraft engine of one or more of these clauses, wherein the operating condition is a high lift operating condition.

The aircraft engine of one or more of these clauses, wherein the operating condition is at least one of a takeoff operating condition, a descent operating condition, or a landing operating condition.

The aircraft engine of one or more of these clauses, wherein in modifying the pitch of the plurality of rotor blades, the controller is configured to increase a ratio of a first airflow over the top of the wing to a second airflow over the bottom of the wing.

The aircraft engine of one or more of these clauses, wherein the rotor assembly of the aircraft engine is an unducted rotor assembly.

An aircraft comprising: a wing; an engine coupled to the wing and defining a circumferential direction, the engine comprising: a turbomachine; a rotor assembly comprising a plurality of rotor blades driven by the rotor assembly, the plurality of rotor blades extending at least partially over a top of the wing when in a first position and at least partially below a bottom of the wing when in a second position; a pitch change mechanism operable with the plurality of rotor blades for changing a pitch of the plurality of rotor blades; and a controller operably connected to the pitch change mechanism and configured to set a pitch of the plurality of rotor blades through the pitch change mechanism at non-uniform pitch angles along the circumferential direction such that the plurality of rotor blades define a first pitch at the first position and a second pitch at the second position wherein the first pitch is different from the second pitch.

The aircraft of one or more of these clauses, wherein the plurality of rotor blades extend at least partially over a top of the wing when in the first position, and wherein the plurality of rotor blades extend at least partially below a bottom of the wing when in the second position.

The aircraft of one or more of these clauses, wherein the top of the wing is a suction side of the wing, and wherein the bottom of the wing is a pressure side of the wing.

The aircraft of one or more of these clauses, wherein in modifying the pitch of the plurality of rotor blades, the controller is configured to increase a ratio of a first airflow over the top of the wing to a second airflow over the bottom of the wing.

What is claimed is:

1. A method of operating an aircraft engine coupled to a wing of an aircraft comprising:
    setting a pitch of a plurality of rotor blades of a rotor assembly of the aircraft engine at non-uniform pitch angles along a circumferential direction of the aircraft engine such that the plurality of rotor blades define a first pitch at a first position and a second pitch at a second position, wherein the second position is 180 degrees offset from the first position, and wherein the first pitch is different from the second pitch; and
    receiving data indicative of an operating condition of the aircraft engine, of the aircraft, or both during operation of the aircraft engine, and wherein setting the pitch of the plurality of rotor blades comprises setting the pitch of the plurality of rotor blades in response to the received data indicative of the operating condition of the aircraft engine, of the aircraft, or both;

wherein setting the pitch of the plurality of rotor blades comprises modifying the pitch of the plurality of rotor blades to non-uniform pitch angles along the circumferential direction such that the plurality of rotor blades define the first pitch at the first position and the second pitch at the second position, and wherein modifying the pitch of the plurality of rotor blades comprises increasing a ratio of a first airflow over the top of the wing to a second airflow over the bottom of the wing.

2. The method of claim 1, wherein the plurality of rotor blades extend at least partially over a top of the wing when in the first position, and wherein the plurality of rotor blades extend at least partially below a bottom of the wing when in the second position.

3. The method of claim 1, wherein the top of the wing is a suction side of the wing, and wherein the bottom of the wing is a pressure side of the wing.

4. The method of claim 1, wherein the operating condition is a high lift operating condition.

5. The method of claim 1, wherein the operating condition is at least one of a takeoff operating condition, a climb operating condition, a descent operating condition, or a landing operating condition.

6. The method of claim 1, wherein receiving data indicative of the operating condition of the aircraft engine comprises receiving data indicative of an altitude, a change in altitude, an attitude of the aircraft, an ambient pressure, or an airspeed.

7. The method of claim 1, wherein the rotor assembly of the aircraft engine is an unducted rotor assembly.

8. The method of claim 7, wherein the aircraft engine is configured as a single unducted rotor engine comprising a turbomachine driving the unducted rotor assembly.

9. The method of claim 1, wherein setting the pitch of the plurality of rotor blades comprises setting the pitch of the plurality of rotor blades with a pitch change mechanism.

10. The method of claim 1, wherein the operating condition is a first operating condition, and wherein the method further comprises:
receiving data indicative of a second operating condition of the aircraft engine, the aircraft, or both, wherein the operating condition is indicative of a low lift operating condition; and
setting the pitch of the plurality of rotor blades to uniform pitch angles along the circumferential direction in response to receiving data indicative of the second operating condition such that the plurality of rotor blades define substantially the same pitch angles when in the first position as when in the second position.

11. An aircraft engine defining a circumferential direction, the aircraft engine comprising:
a turbomachine;
a rotor assembly comprising a plurality of rotor blades driven by the rotor assembly;
a pitch change mechanism operable with the plurality of rotor blades for changing a pitch of the plurality of rotor blades; and
a controller operably connected to the pitch change mechanism and configured to set a pitch of the plurality of rotor blades through the pitch change mechanism at non-uniform pitch angles along the circumferential direction such that the plurality of rotor blades define a first pitch at a first position and a second pitch at a second position, wherein the second position is 180 degrees offset from the first position, and wherein the first pitch is different from the second pitch;

wherein in setting the pitch of the plurality of rotor blades the controller is configured to modify the pitch of the plurality of rotor blades to non-uniform pitch angles along the circumferential direction such that the plurality of rotor blades define the first pitch at the first position and the second pitch at the second position, and wherein modifying the pitch of the plurality of rotor blades comprises increasing a ratio of a first airflow over the top of the wing to a second airflow over the bottom of the wing.

12. The aircraft engine of claim 11, wherein the controller is further configured to receive data indicative of an operating condition of the aircraft engine, an aircraft incorporating the aircraft engine, or both.

13. The aircraft engine of claim 12, wherein the operating condition is a high lift operating condition.

14. The aircraft engine of claim 12, wherein the operating condition is at least one of a takeoff operating condition, a descent operating condition, or a landing operating condition.

15. The aircraft engine of claim 11, wherein the rotor assembly of the aircraft engine is an unducted rotor assembly.

16. The aircraft engine of claim 11, wherein the controller is further configured to receive data indicative of an operating condition of the aircraft engine, an aircraft incorporating the aircraft engine, or both during operation of the aircraft engine, and wherein in setting the pitch of the plurality of rotor blades the controller is configured to set the pitch of the plurality of rotor blades in response to the received data indicative of the operating condition of the aircraft engine, of the aircraft, or both.

17. A method of operating an aircraft engine coupled to a wing of an aircraft comprising:
setting a pitch of a plurality of rotor blades of a rotor assembly of the aircraft engine at non-uniform pitch angles along a circumferential direction of the aircraft engine such that the plurality of rotor blades define a first pitch at a first position and a second pitch at a second position, wherein the second position is 180 degrees offset from the first position, and wherein the first pitch is different from the second pitch; and
wherein in setting the pitch of the plurality of rotor blades comprises modifying the pitch of the plurality of rotor blades to non-uniform pitch angles along the circumferential direction such that the plurality of rotor blades define the first pitch at the first position and the second pitch at the second position, and wherein modifying the pitch of the plurality of rotor blades comprises increasing a ratio of a first airflow over the top of the wing to a second airflow over the bottom of the wing;
receiving data indicative of an operating condition of the aircraft engine, the aircraft, or both, wherein the operating condition is indicative of a low lift operating condition; and
setting the pitch of the plurality of rotor blades to uniform pitch angles along the circumferential direction in response to receiving data indicative of a second operating condition such that the plurality of rotor blades define substantially the same pitch angles when in the first position as when in the second position.

* * * * *